Jan. 26, 1932.  S. HORVATH  1,842,968

SEISMOGRAPH

Filed March 24, 1930  2 Sheets-Sheet 1

Inventor
SEPP HORVATH
Jesse R Stone
Lester B Clark
By
Attorneys

Jan. 26, 1932.  S. HORVATH  1,842,968
SEISMOGRAPH
Filed March 24, 1930   2 Sheets-Sheet 2

Inventor
SEPP HORVATH
Jesse R Stone
Lester B Clark
By
Attorneys.

Patented Jan. 26, 1932

1,842,968

UNITED STATES PATENT OFFICE

SEPP HORVATH, OF HOUSTON, TEXAS

SEISMOGRAPH

Application filed March 24, 1930. Serial No. 438,548.

The invention relates to an improvement in seismographs and recording mechanisms for use in the location of geological structures.

Various types of seismographs and recording instruments have been devised and are now in use. These devices depend upon various principles for their operation and involve the use of both mechanically and electrically registering seismographs. This invention involves the use of instruments embodying the electrical transfer of mechanical vibrations of the ground into corresponding electrical alterations of conditions of electric circuits. With electrical circuits of the type here used very sensitive measurements of these mechanical vibrations can be had by means of high frequency circuits. If we have a high frequency circuit in a resonance position for a certain frequency, we can measure very exactly the smallest changes in this frequency caused either by a change in the capacity or in the self inductance of this circuit. Mechanical vibrations working on one plate of a condenser, or working on a membrane or any other suitable medium to change the magnetic conditions of an induction coil or by causing changes of capacity or self inductance in this high frequency circuit, so that it will be tuned in or out of resonance. This tuning in or out of resonance is following the mechanical impulses without any retardation, and we can therefore transmit the mechanical impulses in the form of electrical impulses, and measure these mechanical impulses quantitatively in the frequency of the oscillations of a high frequency circuit.

The invention also embodies an arrangement of a mechanism for recording the mechanical vibrations which have been transformed into electrical vibrations as well as recording a periodic time interval and at the same time recording the instant at which the mechanical vibrations are caused. It is intended in the practice of the invention to embody the use of an explosive charge as a means of causing mechanical vibrations in the earth. It is to be understood, however, that the invention is not limited to the source of mechanical vibrations as obviously they may be caused in any desired manner.

It is one of the objects of the invention to devise two balanced electrical circuits, one of which is adapted to be unbalanced by mechanical vibrations in combination with a receiving circuit which will record the degree of unbalancing of one of the circuits.

An object of the invention is to couple a seismic pendulum with a high frequency electrical circuit and permit movements of the pendulum to alter the frequency of the circuit.

Another object of the invention is to provide a condenser in one of two balanced circuits, the condenser being of such a type that it is subject to mechanical vibrations to cause a variation in the frequency of the circuit.

Another object is to so alter the self inductance of an electrical circuit that the frequency of the circuit will vary in response to changes in the self inductance.

A still further object of the invention is to provide a condenser wherein one of the plates comprises the surface of a liquid.

A still further object of the invention is to provide a condenser, one plate of which is the surface of the liquid and the other plate of which is adjustable.

Another object of the invention is to provide a mechanism for recording the electrical vibrations caused by mechanical vibrations and to also record a constant time interval and to record the instant at which the mechanical vibrations occur.

Other and further objects of the invention will be readily apparent to those skilled in the art when the following description is considered in connection with the accompanying drawings wherein Fig. 1 is a diagrammatic layout of the complete mechanism for practicing the invention and showing the arrangement of the registering station.

Figure 3:
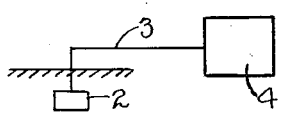
Fig. 3 is a layout for registering stations and receivers which may be used.

The invention may be best understood by having reference to Fig. 3 wherein the numeral 2 represents a charge of explosive or other means for causing mechanical vibrations in the earth. This explosive charge or other means is suitably connected by wiring 3 with a registering station indicated diagrammatically at 4. In this manner the precise time at which the mechanical vibrations are instituted may be transmitted to the registering station 4. For purposes of illustration, this period will be designated as the zero point and the tube 8 will hereinafter be referred to as the zero tube. This is of assistance in the proper operation of the apparatus as the recording features show the elapsed interval of time that occurs between the moment of the cause of the vibrations and the moment when the vibrations arrive at the sound receiving station. With the arrangement here shown the precise instant at which the mechanical vibrations occur may be transmitted through the wires 3 to the registering station 4. Disposed at suitable distances about the charge 2 are shown a plurality of radial sound receivers 5. For purposes of illustration three such stations have been shown but it is to be understood that these may be placed in any desired number and location in order to take full advantage of the mechanical vibrations which are set up by the charge 2.

Figure 1:
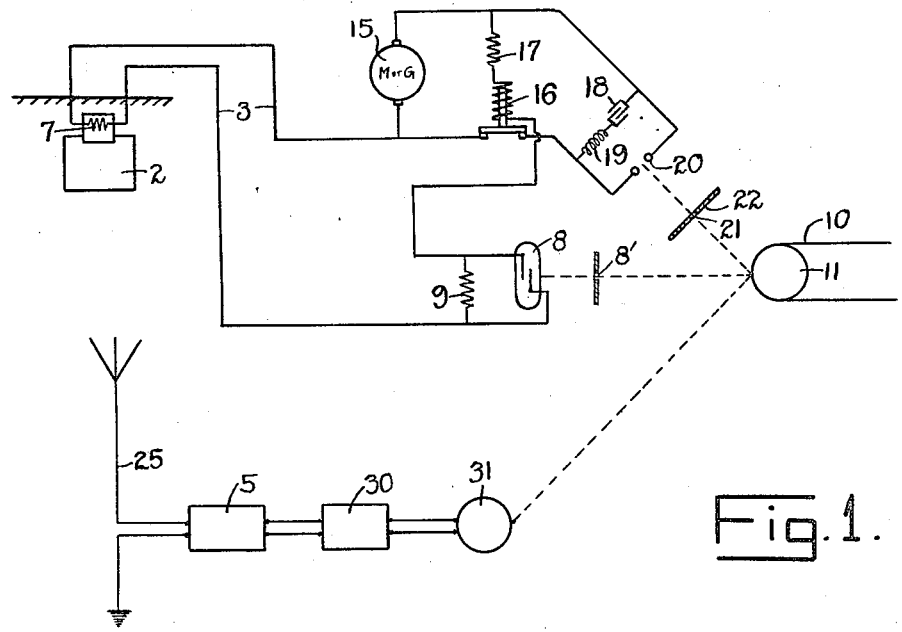
Figure 5:
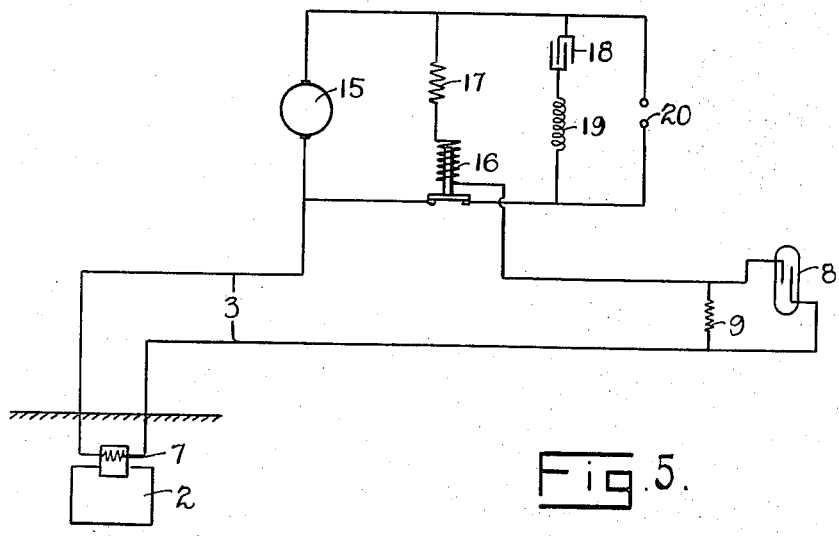
Fig. 5 is a wiring diagram of a registering station.

Figs. 1 and 5 show wiring diagrams of the registering station and its associated mechanisms. The wires 3 are shown as connected with the charge 2, as at 7, in such a manner that as the charge explodes the circuit 3 will be disrupted. A light tube 8 is shown as connected in the circuits 3 in such a manner that it will be extinguished when the circuit is disrupted at 7. I prefer to use at this point a gas filled tube due to the fact that it will be extinguished instantly when the circuit is disrupted. A photographic film 10 is shown as passing over a roller 11 in such a position that it will receive light over a certain area thereof from the tube 8. It is to be understood that this film 10 travels at a predetermined speed. The light from the tube 8 will pass through a slot or opening in the plate 8' onto the film 10 so that when the tube is extinguished this instant will be recorded upon the photographic film 10. A suitable resistance 9 is placed in the tube circuit to adjust the amount of current passing to the tube.

Fig. 1 shows a wiring diagram of the mechanism for recording upon the film 10 a periodic time interval so that the electrical vibrations, which are also recorded on the film, may be interpreted. This mechanism includes a source of current or generator 15, which is connected in circuit with a magnetic switch 16, a resistance 17, and a condenser 18, which is also connected with the inductance 19. This circuit is provided in order that a spark may be created at the spark gap 20. This spark is adapted to pass through a slot 21 in a screen or plate 22. In this manner by adjustment of frequency of this circuit a uniform periodic impression of any desired interval may be made upon one portion of the film 10.

The wiring of the registering station is shown diagrammatically also in Fig. 1 and embodies an antenna 25, which is connected with the radio receiver 5, which is connected with an amplifier 30 adapted to transmit the electrical vibrations to an oscillograph recorder or other mechanism 31. In this manner the mechanical vibrations from the explosive charge 2 are transmitted onto the film 10, as it passes around the wheel 11. With this structure it seems apparent that the film 10 will receive a periodic time impulse from the spark gap 20. It will receive the zero point from the tube 8 and it will receive the electrical impulses representative of the mechanical vibrations from the oscillograph or other mechanism 31. Fig. 5 shows somewhat the same wiring diagram for the time interval impulses as is shown in Fig. 1 but Fig. 5 shows it without the receivers.

Figure 2:
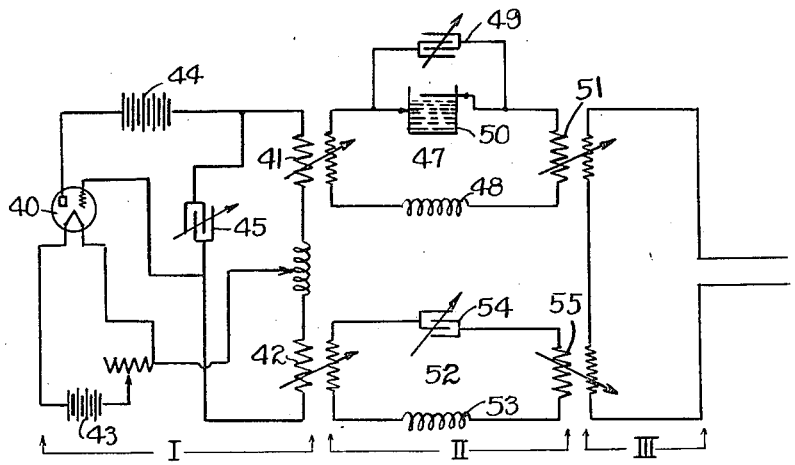
Fig. 2 is a wiring diagram of the sound receiver, which may be used in connection with the invention.

The receiver hook up is believed to be of novel construction and is best seen in Fig. 2. This set includes a circuit indicated by the numeral I, which consists of a tube oscillator 40 connected in any desired manner with the coupling coils 41 and 42. It is to be understood that this circuit includes the usual A batteries at 43, B batteries at 44 and tuning condenser 45. The novel assembly of the receiver is embodied in the circuits II. These circuits involve two balanced closed high frequency circuits which are adapted to be tuned in resonance with the frequency of the tube oscillator 40. One of these circuits 47 includes a self-inductance 48, the coupling coils 41 and 51 and the tuning condenser 49 and a variable condenser 50 which are arranged in parallel. The circuit 52 includes the inductance 53, coupling coils 42 and 55 and the tuning condenser 54.

It is to be understood that under normal conditions the circuits 47 and 52 will be tuned to the same frequency and in resonance. In this manner the circuit shown at III under normal conditions will receive no current from the circuits 47 and 52, as they will be so tuned that the current induced by one will be offset by the other through the coupling coils 51 and 55 which are opposed. The circuit III is intended to be connected to the registering apparatus in any desired manner, either by wire or by wireless transmission.

Figure 6:
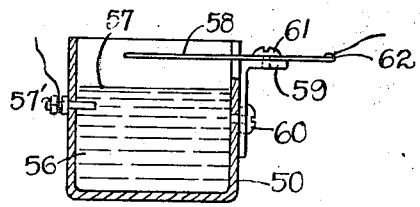
Fig. 6 is a sectional view of one form of the improved condenser.

One of the important features of the invention is the variable condenser 50. This condenser may consist of a suitable portion of a seismic pendulum of any desired type; is illustrated in detail in Fig. 6 and includes a container which is adapted to receive a quantity of quicksilver 56 or any other suitable material. One terminal 57' is shown as passing into the container in such a position that it will be in contact with the quicksilver 56. In this manner it is intended that the upper surface 57 of the quicksilver will serve as one plate of the condenser. The other plate 58 is shown as adjustably mounted upon a bracket 59, which may be adjusted vertically with respect to the container 55 by means of set screw 60. A second set screw 61 provides for lateral adjustment of the plate 58. In this manner the plate may be adjusted to cover all or any desired portion of the surface 57 of the quicksilver and may be adjusted vertically to obtain the desired space between the plate and the surface of the quicksilver. The other terminal of the circuit 47 is connected at 62 to the plate 58.

The frequency of the circuits 47 and 52 may be so tuned that they will be in resonance and no current will be induced in the circuit III. This receiving apparatus may be located at any desired position with respect to the charge 2 in the field. Several receivers may be disposed about the explosive charge. When the charge is exploded the mechanical vibration of the earth will cause vibration of the condenser 50 and the quicksilver 56 therein. This vibration will cause a displacement rippling of the surface 57 of the quicksilver in proportion to the vibration or acceleration and which accordingly changes the spacing between this surface and the plate 58. This change of distance between the plates causes a change in frequency in the circuit 47 so that it is unbalanced with respect to the circuit 52.

The invention may take other forms, one of which may include a portion of a seismic pendulum, that is a pendulum susceptible to the vibration of the earth. This pendulum may be coupled with the self inductance 48 or with the condenser 50 as previously described in such a manner that its movement will alter the self inductance or the capacity of the condenser and unbalance the circuit. Thus if a mass of material of higher magnetic permeability be mounted adjacent the self inductance 48 and subjected to vibration its movement will change the inductance 48 and a measure of the vibration may be obtained.

This unbalancing causes an unequal flow of current in the circuit III so that an electrical impulse may be transmitted from the circuit III to the registering apparatus 4. It is intended that in constructing the receiver sets each of the sets 5 shown in Fig. 3 will be arranged to operate at a somewhat different frequency. Thus the signals transmitted upon unbalancing of each of the receivers will be different as received by the registering station 4 and by inspection of the film 10 the impulses from each station may be interpreted so that the elapsed time interval for the mechanical vibrations to have reached each of the receiving stations will be available.

Figure 4:
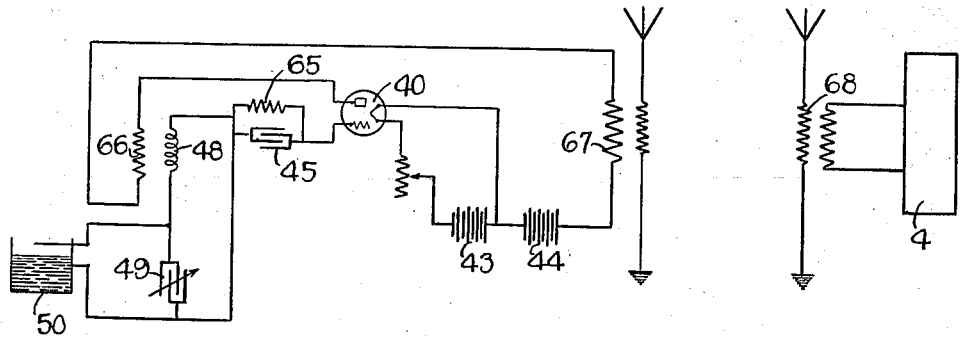
Fig. 4 is a modification of a receiving station for receiving and transforming mechanical impulses into electrical impulses and transmitting them to a registering station.

Fig. 4 shows a modified form of circuit which may be used in connection with the invention and includes batteries 43, 44, the tube oscillator 40, tuning condenser 45, the inductance 48, and the resistances 65 and 66. This circuit also includes the tuning condenser 49 and the variable condenser 50. With this arrangement the sound impulses will be received by the condenser 50 and transported into electrical impulses which will be transmitted to the coupling antenna 67 whereby they will be transmitted by wireless to the receiving antenna 68 and the registering station 4. It is intended in this modification that the mechanical vibrations will be received and cause variation in the frequency of the circuit which will be transmitted by the antenna 67.

The invention attempts to take advantage of the fact that most accurate measurements for small displacements may be recorded by means of variation of the capacity or self induction in a high frequency circuit. By using the variation in the capacity or self induction of a high frequency circuit, one part of which may be quicksilver or any other conducting liquid, I am able very accurately to control the frequency of the circuit so that very slight mechanical vibrations will cause unbalancing of the circuit which has been tuned. The mechanical vibrations will therefore change the distance between the condenser plates shown herewith and therefore the capacity of the condenser, which changes the frequency of the circuit. It is intended that the one plate of the condenser may be formed by the surface of a liquid or by any suitable intermediate medium or by any suitable part of a seismic pendulum. It is understood that in the case of a condenser having two plates the changes of capacity of the condenser are directly proportionate to the changes of the distance between the two plates. Therefore, any movement of the ground which is caused by an explosion or other medium will cause a change of distance between the two plates of the condenser. The changes in the frequency of the two circuits tends to induce the current in the circuit III and I preferably employ the differential method in that the two balanced circuits 47 and 52 are coupled to the circuit III in opposite directions so that when they are tuned and in resonance no current will be induced in this circuit.

While I have shown and described different forms of the invention it is to be understood that the apparatus may be altered without departing from the spirit of the invention and if desired the receiving and registering stations may be combined as a single unit.

What I claim as new is:

1. In combination with an electrical impulse receiving set, a condenser adapted to change in capacity in proportion to mechanical vibrations, a pair of tuned circuits, said condenser being connected in one of said circuits whereby said circuit will be detuned by said condenser, and means to record the degree of detuning of said circuit.

2. In combination with an electrical impulse receiving set, a condenser adapted to change in capacity in proportion to mechanical vibrations, a pair of tuned circuits, said condenser being connected in one of said circuits whereby said circuit will be detuned by said condenser, and means to record the degree of detuning of said circuit, said condenser including two plates one of which is formed by a liquid surface.

3. In combination with a seismic apparatus means to cause mechanical vibration of a portion of the earth's surface, means including a liquid surface for transposing said vibrations to electrical impulses, and means to record said impulses as an indication of the path of travel of said vibrations from their source to said second means.

4. An apparatus of the character described including a source of mechanical vibration, a plurality of receiver stations disposed about said source, each of said receivers being tuned at a different frequency, and a registering station to receive the impulses from said receivers.

5. A method of subsurface prospecting which includes setting up artificial vibrations in a portion of the earth's surface, exposing an electrical conducting liquid to such vibrations and utilizing the movement of the conducting liquid as a means of determining the location of the subsurface formations causing deviation of the artificial vibrations.

6. A method of transposing mechanical vibrations into electrical impulses comprising setting up a high frequency electrical circuit having a plate condenser therein with a liquid surface as one plate, and subjecting the liquid to the mechanical vibrations whereby the surface thereof is disturbed to alter the frequency of the circuit.

7. A method of changing the frequency of an electrical circuit comprising inserting in the circuit a variable condenser including an adjustable plate and a liquid surface plate, and vibrating the liquid surface plate to change the capacity of the condenser and thus the frequency of the circuit.

8. In combination with an electrical impulse receiving set a self inductance adapted to change in proportion to mechanical vibrations, a pair of tuned circuits, said condenser being connected in one of said circuits whereby said circuit will be detuned by said condenser, and means to record the degree of detuning of said circuit.

9. In combination with an electrical impulse receiving set a condenser adapted to change in capacity in proportion to mechanical vibrations, a pair of tuned circuits, said condenser being connected in one of said circuits whereby said circuit will be detuned by said condenser, said condenser including two plates one of which is formed by any suitable portion of a seismic pendulum, and means to record the degree of detuning of said circuit, said condenser including two plates one of which is formed by a liquid surface.

In testimony whereof I hereunto affix my signature this 11th day of March, A. D. 1930.

SEPP HORVATH.